US006358147B1

(12) United States Patent
Jaffe et al.

(10) Patent No.: US 6,358,147 B1
(45) Date of Patent: Mar. 19, 2002

(54) GAMING MACHINE WITH MULTIPLE PAYOFF MODES AND AWARD PRESENTATION SCHEMES

(75) Inventors: Joel R. Jaffe, Evanston; Stephen Yuen, Chicago, both of IL (US)

(73) Assignee: WMS Gaming Inc., Chicago, IL (US)

(*) Notice: Subject to any disclaimer, the term of this patent is extended or adjusted under 35 U.S.C. 154(b) by 0 days.

(21) Appl. No.: 09/339,286

(22) Filed: Jun. 23, 1999

(51) Int. Cl.[7] .................................................. A63F 13/00

(52) U.S. Cl. ............................................ 463/20; 463/25

(58) Field of Search ......................... 463/40–42, 16–20, 463/25, 29; 273/138.1, 138.2, 139; 700/90–93

(56) References Cited

U.S. PATENT DOCUMENTS

| | | |
|---|---|---|
| 3,281,149 A | 10/1966 | Miller |
| 4,095,795 A | 6/1978 | Saxton et al. |
| 4,306,768 A | 12/1981 | Egging |

(List continued on next page.)

FOREIGN PATENT DOCUMENTS

| | | |
|---|---|---|
| AU | 70382/94 A * | 8/1995 |
| DE | 31 39 585 | 4/1983 |
| DE | 37 00 861 | 7/1988 |

(List continued on next page.)

OTHER PUBLICATIONS

Brochure of Monopoly SWP Game; JPM Ltd., 4 pgs.; date unknown.

WMS'Big Money Advertisement Sheet; WMS Gaming Inc.; 1 pg.; date unknown.

WMS'Piggy Bankin Advertisement Sheet; WMs Gaming Inc.; 1 pg.; date unknown.

WMS'Pirate's Thunder Advertisement Sheet; WMS Gaming Inc.; 1 pg.; date unknown.

Bally Circus Ad, excerpt from "Lemons, Cherries and Bell Fruit Gum"; Richard M. Bueschel; 3 pgs.; date unknown.

Bally Bingo Ad, excerpt from "Lemons, Cherries and Bell Fruit Gum"; Richard M. Bueschel; 1 pg.; date unkown.

Las Vegas Slot Machine Ad, excerpt from "Lemons, Cherries and Bell Fruit Gum"; Richard M. Bueschel; 1 pg.; date unknown.

Phantom Haus website publication; Williams Electronics Games, Inc.; 2 pgs.; date unknown.

(List continued on next page.)

*Primary Examiner*—Valencia Martin-Wallace
*Assistant Examiner*—John M Hotaling, II
(74) *Attorney, Agent, or Firm*—Jenkens & Gilchrist

(57) ABSTRACT

A slot machine with multiple payoff modes and award presentations. The payoff modes in one embodiment are associated with a basic game and include a first and second payoff mode, the second payoff mode defining a "SUPER SCATTER" feature. Game outcomes are selected in the first and second payoff mode and symbol groups associated with the game outcomes are evaluated in the first payoff mode for symbol combinations displayed relative to one or more paylines and in the second payoff mode for symbol combinations displayed in scatter-pay format. In one embodiment, the machine operates in the first payoff mode until the occurrence of a symbol combination triggering the second payoff mode, then operates in the second payoff mode for a single spin before returning to the first payoff mode. The award presentations include a non-linear sequence of award values which in one embodiment are associated with a bonus game characterized by characters bidding upon a selected object that may be presented in irregular time intervals. The sequence of award values (bids) including a first value ("opening bid"), a number of intermediate values (bids) and a final value (a "winning" bid). A payoff is awarded based on the final winning bid.

20 Claims, 5 Drawing Sheets

U.S. PATENT DOCUMENTS

| | | | | | |
|---|---|---|---|---|---|
| 4,335,809 | A | | 6/1982 | Wain | |
| 4,448,419 | A | | 5/1984 | Telnaes | |
| 4,508,345 | A | | 4/1985 | Okada | |
| 4,624,459 | A | | 11/1986 | Kaufman | |
| 4,721,307 | A | | 1/1988 | Okada | |
| 4,763,256 | A | | 8/1988 | DeMar | |
| 4,772,023 | A | | 9/1988 | Okada | |
| 4,805,907 | A | | 2/1989 | Hagiwara | |
| 4,871,171 | A | | 10/1989 | Rivero | |
| 5,083,271 | A | * | 1/1992 | Thacher et al. | 700/91 |
| 5,083,785 | A | | 1/1992 | Okada | |
| 5,169,147 | A | | 12/1992 | Hamano | |
| 5,205,555 | A | | 4/1993 | Hamano | |
| 5,259,616 | A | | 11/1993 | Bergmann | |
| 5,292,127 | A | | 3/1994 | Kelly et al. | |
| 5,342,047 | A | | 8/1994 | Heidel et al. | |
| 5,342,049 | A | | 8/1994 | Wichinsky et al. | |
| 5,380,008 | A | | 1/1995 | Mathis et al. | |
| 5,393,057 | A | | 2/1995 | Marnell, II | |
| 5,401,024 | A | | 3/1995 | Simunek | |
| 5,415,404 | A | | 5/1995 | Joshi et al. | |
| 5,429,361 | A | | 7/1995 | Raven et al. | |
| 5,449,173 | A | | 9/1995 | Thomas et al. | |
| 5,456,465 | A | | 10/1995 | Durham | |
| 5,456,466 | A | | 10/1995 | Miles | |
| 5,542,669 | A | | 8/1996 | Charron et al. | |
| 5,547,192 | A | | 8/1996 | Ishibashi | |
| 5,624,119 | A | | 4/1997 | Leake | |
| 5,647,798 | A | | 7/1997 | Falciglia | |
| 5,664,781 | A | | 9/1997 | Feola | |
| 5,697,843 | A | | 12/1997 | Manship et al. | |
| 5,704,835 | A | | 1/1998 | Dietz, II | |
| 5,722,891 | A | | 3/1998 | Inoue | |
| 5,779,545 | A | | 7/1998 | Berg et al. | |
| 5,788,573 | A | | 8/1998 | Baerlocher et al. | |
| 5,823,874 | A | | 10/1998 | Adams | |
| 5,848,932 | A | | 12/1998 | Adams | |
| 6,045,447 | A | * | 4/2000 | Yoshizawa et al. | 463/31 |
| 6,068,552 | A | * | 5/2000 | Walker et al. | 463/21 |
| 6,089,976 | A | * | 7/2000 | Schneider et al. | 463/16 |
| 6,155,925 | A | * | 10/2000 | Giobbi | 463/20 |
| 6,159,098 | A | * | 10/2000 | Stomiany et al. | 463/25 |
| 6,159,097 | A | * | 12/2000 | Gura | 463/20 |
| 6,190,255 | B1 | * | 2/2001 | Thomas et al. | 463/20 |

FOREIGN PATENT DOCUMENTS

| | | |
|---|---|---|
| DE | 40 14 477 | 7/1991 |
| EP | 0 142 371 | 5/1985 |
| EP | 0 148 001 | 7/1985 |
| EP | 0 333 338 | 9/1989 |
| EP | 0 577 415 A2 | 1/1994 |
| EP | 0 874 337 | 10/1998 |
| FR | 1 474 617 | 4/1966 |
| GB | 1129607 | 10/1968 |
| GB | 1 476 848 | 6/1977 |
| GB | 1 591 623 | 6/1981 |
| GB | 2 066 991 | 7/1981 |
| GB | 2 072 395 | 9/1981 |
| GB | 2 118 445 | 1/1982 |
| GB | 2 083 936 | 3/1982 |
| GB | 2 084 371 | 4/1982 |
| GB | 2 096 376 | 10/1982 |
| GB | 2 097 160 | 10/1982 |
| GB | 2 105 891 | 3/1983 |
| GB | 2 106 685 | 4/1983 |
| GB | 2 117 952 | 10/1983 |
| GB | 2 147 442 | 5/1985 |
| GB | 2 147 773 | 5/1985 |
| GB | 2 152 262 | 7/1985 |
| GB | 2 153 572 | 8/1985 |
| GB | 2 157 047 | 10/1985 |
| GB | 2 165 385 | 4/1986 |
| GB | 2 170 636 | 8/1986 |
| GB | 2 180 087 | 3/1987 |
| GB | 2 181 589 | 4/1987 |
| GB | 2 183 882 | 6/1987 |
| GB | 2 191 030 | 12/1987 |
| GB | 2 197 974 | 6/1988 |
| GB | 2 202 984 | 10/1988 |
| GB | 2 204 436 | 11/1988 |
| GB | 2 210 191 | 6/1989 |
| GB | 2 222 712 | 3/1990 |
| GB | 2 226 907 | 7/1990 |
| GB | 2 229 565 | 9/1990 |
| GB | 2 230 373 | 10/1990 |
| GB | 2 233 806 | 1/1991 |
| GB | 2 242 300 | 9/1991 |
| GB | 2 253 154 | 9/1992 |
| GB | 2 262 642 | 6/1993 |
| GB | 2 270 787 | 3/1994 |
| GB | 2 273 384 | 8/1994 |
| GB | 2 287 567 | 9/1995 |
| GB | 2 297 857 | 8/1996 |
| GB | 2 298 508 | 9/1996 |
| WO | WO 8808179 | 10/1988 |
| WO | WO 8912875 | 12/1989 |
| WO | WO 9210818 | 6/1992 |
| WO | WO 9401840 | 1/1994 |
| WO | WO 96/08799 | 3/1996 |

OTHER PUBLICATIONS

Buccaneer Gold website publication; Silicon Gaming Inc.; 2 pgs.; date Jul. 1, 1998.

Fort Knox website publication; Silicon Gaming Inc.; 2 pgs. date Jul. 17, 1998.

Lady of Fortune website publication; Silicon Gaming Inc.; 2 pgs.; date Jul. 17, 1998.

Riddle of the Sphinx website publication; Silicon Gaming Inc.; 2 pgs.; date Jul.17, 1998.

Information Sheets for Kaleidoscope game; Williams Electronics Games, Inc.; 3 pgs.; date unknown.

Information Sheets for Double Wild & Loose Game; Williams Electronics, Inc.; 3 pgs. date unknown.

Information Sheets for Wild Cherry (120A) Game; International Game Technology.; 2 pgs.; date Nov. 7, 1994.

Information Sheets for Double Wild Cherry (195A) Game; International Game Technology.; 3 pgs.; date Nov. 7, 1994.

Chapters 10, 11, 12; excerpts from "Lemons, Cherries and Bell–Fruit–Gum"; Richard M. Bueschel; 71 pgs.; 1995.

Advertisement, Club Vegas, Barcrest; 1 pg.; date unknown.

Advertisment, Viva Club Vegas!, Barcrest; 1 pg.; date unknown.

Advertisement, "Monopoly: Maygay There for the Taking"; 2 pgs.; date unknown.

Advertisement, "The Big Breakfast"; Channel Four Television Corporation; 2 pgs.; 1993.

Advertisement, "Midas Touch"; 2 pgs.; date unknown.

Advertisement, "Acropolis"; Automatic (Fruit) Designs, Ltd.; 2 pgs.; date unknown.

Advertisement, "Adders & Ladders"; Barcrest; 2 pgs.; date unknown.

Advertisement, "The Wild West"; Bell–Fruit Manufacturing; 2 pgs.; date unknown.

Advertisement, "Premier Club Manager"; Bell–Fruit Manufacturing; 2 pgs.; date unknown.

Advertisement, "Fortune Wheel"; Project Customer Services; 2 pgs.; date unknown.
Advertisement, "Road Hog"; Barcrest; 2 pgs.; date unknown.
Advertisement, "Viva! Las Vegas"; Barcrest; 2 pgs.; date unknown.
Advertisement, "Golden Circle"; Delta Automaten, 1 pg.; date unknown.
Advertisement, "Club Double"; M–D–M Coin Sales Ltd.; 2 pgs.; date unknown.
Advertisement, "Treasure Island"; American Alpha, Inc.; 1 pg.; date unknown.
Advertisement, "Bonus Card"; Andries Robert Automatic s.p.r.l.; 1 pg.; date unknown.
Advertisement, "Super Square"; Maygay Machines Ltd.; 2 pgs.; date unknown.
Advertisement, "Lucky Bank"; 1 pg.; date unknown.
Advertisement, "Happy Clown"; Andries Robert Automatic s.p.r.l.; 1 pg.; date unknown.
Advertisement, "Jackpot Stampede"; WMS Gaming Inc.; 2 pgs.; date unknown.
Brochure, "Perfect Universal Slot Machines"; Universal Co., Ltd.; 16 pgs.; date unknown.
Advertisement, "Club Make a Million"; Bell–Fruit Manufacturing Co., Ltd.; 2 pgs.; date unknown.
Advertisement, "Instant Jackpots"; Bell–Fruit Manufacturing Co., Ltd.; 2 pgs.; date unknown.
Cover page, "Enter Disposable Gaming"; *Euroslot. The International Coin–Operated Machine Journal*; 1 pg.; Apr., 1994.
Advertisement, Barcrest Limited; 1 pg.; date unknown.
Cover page, "Covers Your World"; *Euroslot. The Currency of the Coin Machine Industry*; 1 pg.; date unknown.
Article, "Bangkok on the Brink"; *Euroslot. The International Coin–Operated Machine Journal*; 2 pgs.; Nov., 1993.
Article, "Scandinavia on the Brink of the EU melting pot"; *Euroslot. The International Coin–Operated Machine Journal*; 2 pgs.; Aug., 1994.
Advertisement, "Only Fools and Horses"; Bell–Fruit Manufacturing Co., Ltd.; 2 pgs.; date unknown.
Advertisement, "Main Attraction"; Bell–Fruit Manufacturing Co., Ltd., 2 pgs.; date unknown.
Brochure, "World Players"; Barcrest; 6 pgs.; date unknown.
Brochure, "JPM Presents Monopoly Deluxe"; JPM International Ltd.; 5 pgs.; date unknown.
Brochure, "The 50th Show"; Ate International; 2 pgs.; Jan. 1994.
Advertisement, "Colossus"; AFD.; 1 pg.; date unknown.
Advertisement, "Wheel of Fortune"; Project Creating Entertainment; 2 pgs.; date unknown.
Advertisement, "Lucky Horseshoes"; JPM Automatic Machines Ltd.; 2 pgs.; date unknown.
Advertisement, "Lucky Jackpots"; JPM Automatic Machines Ltd.; 2 pgs.; date unknown.
Advertisement, "Monopoly"; JPM Automatic Machines Ltd.; 2 pgs.; date unknown.
Arabian Riches website publications; Silicon Gaming Inc.; 2 pgs.; date Jul. 17, 1998.

* cited by examiner

GAMING MACHINE WITH MULTIPLE PAYOFF MODES AND AWARD PRESENTATION SCHEMES

FIELD OF THE INVENTION

The present invention relates generally to gaming machines and, more particularly, to gaming machines with multiple payoff modes and award presentation schemes.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available, because such machines attract frequent play and hence increase profitability to the operator.

One concept which has been successfully employed to enhance the entertainment value of a game is the concept of a "secondary" or "bonus" game which may be played in conjunction with a "basic" game. The bonus game may comprise any type of game, either similar to or completely different from the basic game, which is entered upon the occurrence of a selected event or outcome of the basic game. Generally, bonus games provide a greater expectation of winning than the basic game and may also be accompanied with more attractive or unusual video displays and/or audio. Because the bonus game concept offers tremendous advantages in player appeal and excitement relative to other known games, and because such games are attractive to both players and operators, there is a continuing need to develop gaming machines with new types of bonus (games to satisfy the demands of players and operators. The present invention is directed to satisfying this need.

SUMMARY OF THE INVENTION

In accordance with one aspect of the present invention, there is provided a slot machine operable in a first and second payoff mode. The slot machine includes a processor operable to select game outcomes in the first and second payoff mode and a display for displaying symbol groups associated with the game outcomes. Each of the symbol groups consist of a plurality of symbols displayed at a plurality of display positions. The slot machine includes symbol evaluation means for evaluating the symbol groups displayed in the first and second payoff modes. The symbol groups displayed in one of the first and second payoff modes are evaluated for symbol combinations displayed relative to one or more paylines and the symbol groups displayed in the other of the first and second payoff modes are evaluated for symbol combinations displayed in scatter-pay format. In one embodiment, the processor operates in the first payoff mode until the occurrence of a symbol combination triggering the second payoff mode, then operates in the second payoff mode for a fixed number of spins before returning to the first payoff mode.

In accordance with another aspect of the present invention, there is provided a method of operating a gaming machine under control of a processor to execute a bonus game program defining an award presentation. The method comprises selecting, under processor control, a sequence of award values for the award presentation, the sequence of award values including an opening award value, a number of intermediate award values and a final award value. The sequence of award values are presented to a player, and a payoff is awarded based on the final award value.

In accordance with yet another aspect of the present invention, there is provided a method of operating a gaming machine generally as described above, wherein the award presentation has an auction theme in which bids are made upon a selected object. The opening award value defines an opening bid, the intermediate award values define intermediate bids and the final award value defines a winning bid. In one embodiment, the game program defines a plurality of game characters for presenting the bids. The characters which present the bids are selectable under either player or processor control.

In accordance with yet another aspect of the present invention, there is provided a gaming machine having a presentation element and a processor. The processor causes the presentation element to successively present a non-linear increasing sequence of potential payouts to a player. The presentation element presents the sequence of potential payouts at irregular time intervals. A final payout is awarded to the player from one of the potential payouts. The sequence of potential payouts may be bids made upon a selected object presented by the presentation element. In accordance with another aspect of the present invention, there is provided a method for operating a gaming machine under the control of a processor. The method comprises providing a presentation element and successively presenting on the presentation element a nonlinear increasing sequence of potential payouts to a player. The sequence of potential payouts are presented by the presentation clement at irregular time intervals. The method also includes awarding the player at least a final one of the potential payouts.

BRIEF DESCRIPTION OF THE DRAWINGS

The foregoing and other advantages of the invention will become apparent upon reading the following detailed description and upon reference to the drawings in which.

Figure 1:
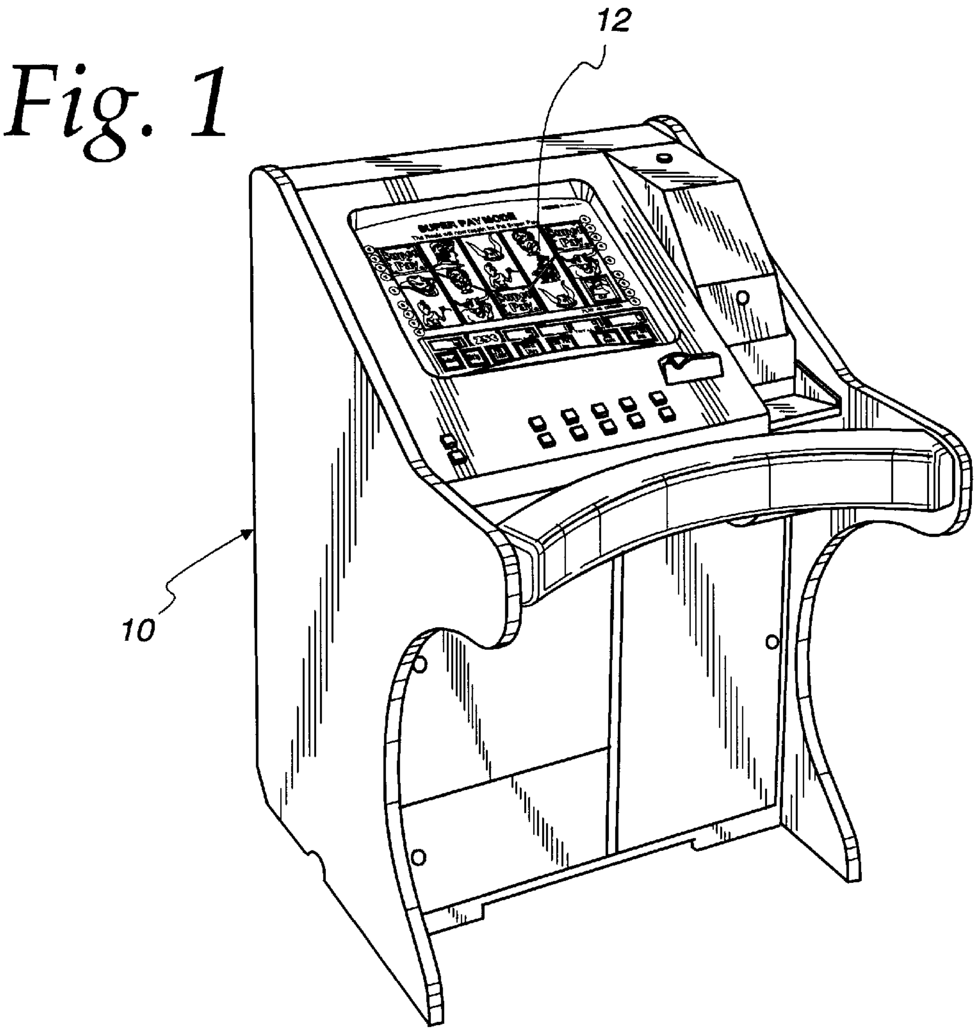
FIG. 1 is a perspective view of a video gaming machine operable to implement a bonus game with auction theme according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a video gaming machine 10 which may be used to implement a basic game and bonus game according to the present invention. The gaming machine 10 includes a video display 12 which in one embodiment comprises a touch-screen CRT display. Alternatively, the video display 12 may comprise a dot matrix, LED, LCD, electro-luminescent display or generally any type of video display known in the art. In the illustrated embodiment, the video gaming machine 10 comprises a "slant-top" version, in which the video display 12 is slanted at about a thirty-degree angle toward the player. It will be appreciated, however, that any of several other models of gaming machines are within the scope of the present invention including, for example, "upright" versions in which the video display 12 is oriented vertically relative to the player, or gaming machines which include mechanical, rather than video displays.

In one embodiment, the gaming machine 10 is operable to play a game entitled WINNING BID™ which features a basic game in the form of a slot machine with five simulated spinning reels (see FIG. 3) and a bonus game having an art auction theme. It will be appreciated, however, that the gaming machine 10 may be implemented with games other than the WINNING BID™ game and/or with any of several alternative game themes.

Figure 2:
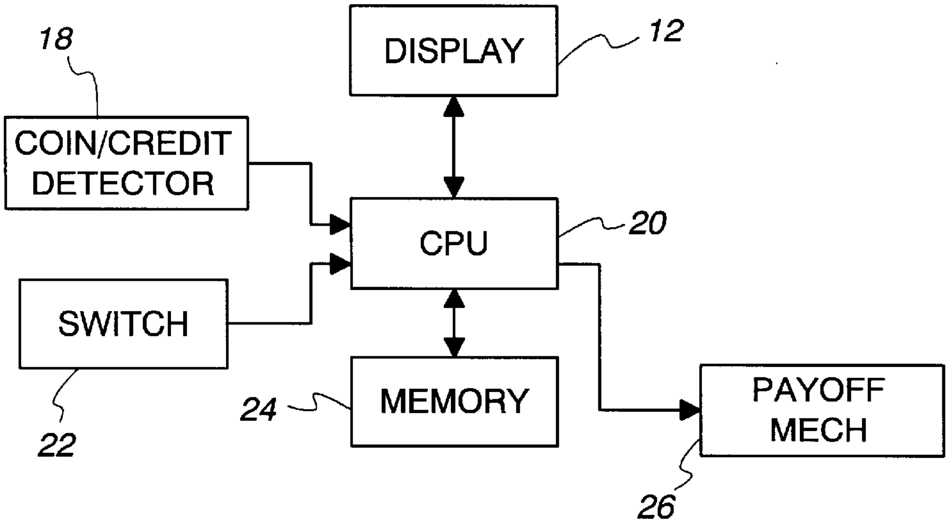
FIG. 2 is a block diagram of the video gaming machine of FIG. 1.

FIG. 2 is a block diagram of a control system suitable for operating the gaming machine 10. Coin/credit detector 18 signals a CPU 20 when a player has inserted a number of coins or played a number of credits. Then, the CPU 20 operates to execute a basic game program which causes the video display 12 to display the basic game which includes simulated reels with symbols displayed thereon (see FIG. 3). The basic game commences in response to the player activating a switch 22 (e.g., by pulling a lever or pushing a button), causing the CPU 20 to set the reels in motion, randomly select a game outcome and then stop the reels to display symbols corresponding to the pre-selected game outcome. In one embodiment, certain ones of the basic game outcomes cause the CPU 20 to enter a SUPER SCATTER spinning reel pay feature and certain other outcomes cause the CPU 20 to enter a bonus mode causing the video display 12 to show a bonus game. The WINNING BID TM SUPER SCATTER feature and bonus game will be described in detail in relation to FIGS. 4–8.

A system memory 24 stores control software, operational instructions and data associated with the gaming machine 10. In one embodiment, the memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff of coins or credits to the player in response to certain winning outcomes which might occur in the basic game or bonus game. The payoff amounts corresponding to certain combinations of symbols in the basic game is predetermined according to a pay table stored in system memory 24. The payoff amounts corresponding to certain outcomes of the bonus game are also stored in system memory 24.

Figure 3:
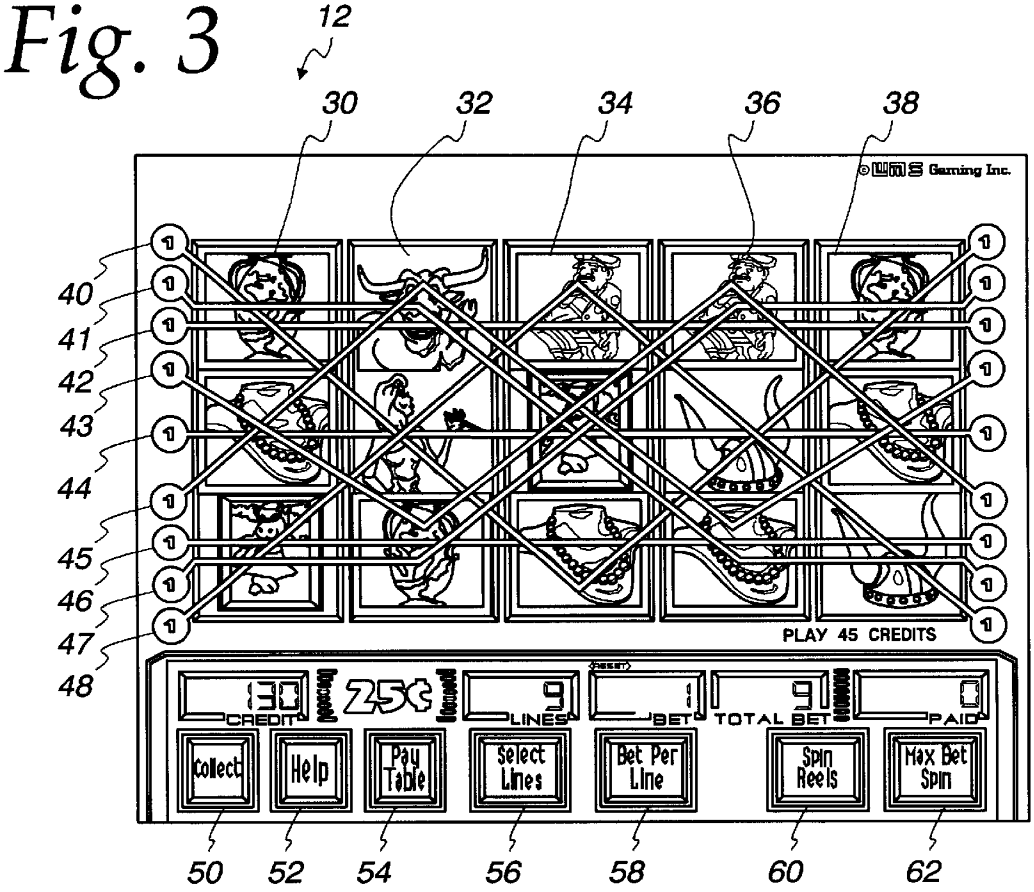
FIG. 3 is an illustration of a five-reel, nine-line basic game which is played on the video gaming machine of FIG. 1 according to one embodiment of the present invention.

As shown in FIG. 3, the WINNING BID™ basic game is implemented on the video display 12 on five video simulated spinning reels 30, 32, 34, 36 and 38 (hereinafter "reels") with nine paylines 40–48. Generally, game play is initiated by inserting a number of coins or playing a number of credits, causing the CPU 20 (FIG. 2) to activate a number of paylines corresponding to the number of coins or credits played. In one embodiment, the player selects the number of paylines (between one and nine) to play by pressing the "Select Lines" key 56 on the video display 12. The player then chooses the number of coins or credits to bet on the selected paylines by pressing the "Bet Per fine" key 58.

After activation of the paylines, the reels 30, 32, 34, 36 and 38 may be set in motion by touching the "Spin Reels" key 60 or, if the player wishes to bet the maximum amount per line, by using the "Max Bet Spin" key 62 on the video display 12. Alternatively, other mechanisms such as, for example, a lever or push button may be used to set the reels in motion. The CPU 20 uses a random number generator (not shown) to select a game outcome (e.g., "basic" game outcome) corresponding to a particular set of reel "stop positions." The CPU 20 then causes each of the video reels 30, 32, 34, 36 and 38 to stop at the appropriate stop position. Video symbols are displayed on the reels 30, 32, 34, 36 and 38 to graphically illustrate the reel stop position and indicate whether the stop position of the reels represents a winning game outcome.

Table 1 indicates the various video symbols on reels 30 through 38 in one embodiment of the WINNING BID™ basic game. The various symbols used in one embodiment of the WINNING BID™ basic game include: "AUCTION," "VIKING," "ACTRESS," "LAMP," "GUARD," "PEARLS," "STEER," "URN," "GAVEL" and "SUPER SCATTER."

TABLE 1

WINNING BID ™ REEL SYMBOLS

| Reel 30 | Reel 32 | Reel 34 | Reel 35 | Reel 38 |
|---|---|---|---|---|
| Auctioneer | Auctioneer | Auctioneer | Auctioneer | Auctioneer |
| Gavel | Gavel | Gavel | Viking | Viking |
| Viking | Viking | Pearls | Lamp | Lamp |
| Actress | Actress | Actress | Actress | Actress |
| Lamp | Pearls | Super | Super | Super |
| Viking | Viking | Viking | Viking | Viking |
| Guard | Guard | Guard | Guard | Guard |
| Lamp | Lamp | Super | Super | Super |
| Pearls | Pearls | Pearls | Pearls | Pearls |
| Steer | Steer | Steer | Steer | Steer |
| Gavel | Gavel | Gavel | Lamp | Lamp |
| Viking | Viking | Viking | Viking | Viking |
| Steer | Steer | Steer | Steer | Steer |
| Lamp | Pearls | Lamp | Pearls | Pearls |
| Viking | Lamp | Pearls | Lamp | Lamp |
| Guard | Guard | Guard | Guard | Guard |
| Gavel | Gavel | Gavel | Viking | Viking |
| Lamp | Viking | Lamp | Pearls | Urn |
| Auctioneer | Auctioneer | Auctioneer | Auctioneer | Auctioneer |
| Viking | Lamp | Super | Super | Super |
| Pearls | Urn | Urn | Urn | Urn |
| Actress | Actress | Actress | Actress | Actress |
| Gavel | Gavel | Gavel | Viking | Pearls |

TABLE 1-continued

| WINNING BID ™ REEL SYMBOLS | | | | |
|---|---|---|---|---|
| Reel 30 | Reel 32 | Reel 34 | Reel 35 | Reel 38 |
| Lamp | Urn | Urn | Urn | Urn |
| Guard | Lamp | Guard | Lamp | Viking |
| Pearls | Viking | Lamp | Super | Pearls |
| Urn | Urn | Urn | Pearls | Lamp |
| Steer | Steer | Steer | Steer | Steer |
| Gavel | Gavel | Super | Lamp | Super |
| Urn | Urn | Urn | Super | Lamp |
| Steer | Lamp | Auctioneer | Auctioneer | Viking |
| Pearls | Pearls | Super | Lamp | Super |
| Urn | Urn | Lamp | Urn | Urn |
| Actress | Actress | Actress | Actress | Actress |
| Pearls | Pearls | Super | Pearls | Lamp |
| Urn | Urn | Viking | Urn | Urn |
| Actress | Lamp | Actress | Actress | Actress |
| Pearls | Pearls | Lamp | Pearls | Lamp |
| Urn | Urn | Urn | Urn | Urn |
| Steer | Lamp | Viking | Steer | Steer |
| Viking | Viking | Pearls | Pearls | Lamp |
| Pearls | Pearls | Lamp | Lamp | Pearls |
| Urn | Urn | Urn | Urn | Urn |
| Lamp | Viking | Pearls | Pearls | Lamp |
| X | Pearls | Viking | Viking | Pearls |
| X | X | Urn | Urn | Urn |
| X | X | Pearls | Pearls | Viking |
| X | X | Viking | Viking | Pearls |
| X | X | Urn | Urn | Urn |
| X | X | Pearls | X | Viking |
| X | X | Viking | X | Pearls |
| X | X | X | X | X |
| X | X | X | X | X |
| X | X | X | X | X |
| X | X | X | X | X |
| X | X | X | X | X |

In the embodiment of FIG. 3 three symbols are displayed at three respective display positions (i.e., "upper," "center" and "lower") on each reel 30, 32, 34, 36, 38 thus defining a symbol group of fifteen symbols for each game outcome. Specifically, in the illustrated embodiment, reel 30 includes an "URN" symbol in the upper display position, a "PEARLS" symbol in the center display position and a "PAINTING" symbol in the lower display position; reel 32 includes an "STEER" symbol in the upper display position, an "ACTRESS" symbol in the center display position and an "URN" symbol in the lower display position; reel 34 includes a "GUARD" symbol in the upper display position, a "PAINTING" symbol in the center display position and a "PEARLS" symbol in the lower display position; reel 36 includes a "GUARD" symbol in the upper display position, a "VIKING HELMET" (hereinafter "VIKING") symbol in the center display position and a "PEARLS" symbol in the lower display position; reel 38 includes an "URN" symbol in the upper display position, a "PEARLS" symbol in the center display position and a "VIKING" symbol in the lower display position.

In the embodiment of FIG. 3, each of the paylines 40–48 extend through one symbol on each of the five reels 30, 32, 34, 36 and 38. Payline 40 starts at the upper left symbol (e.g., "URN") on reel 30, extends through the center symbol (e.g., "ACTRESS") on reel 32, the lower symbol (e.g., "PEARLS") on reel 34, the center symbol (e.g., "VIKING") on reel 36 and terminates at the top symbol (e.g., "URN") on reel 38. Payline 41 starts at the upper left symbol (e.g., "URN") on reel 30, extends through the upper symbol (e.g., "STEER") on reel 32, the center symbol (e.g., "PAINTING") on reel 34, the lower symbol (e.g., "PEARLS") on reel 36 and terminates at the lower symbol (e.g., "VIKING") on reel 38. Payline 42 extends through the top symbol on each reel (e.g., "URN" on reel 30, "STEER" on reel 32, "GUARD" on reel 34, "GUARD" on reel 36 and "URN" on reel 38.) Payline 43 starts at the center symbol (e.g., "PEARLS") on reel 30, extends through the lower symbol (e.g., "URN") on reel 32, the center symbol (e.g., "PAINTING") on reel 34, the top symbol (e.g., "GUARD") on reel 36 and terminates at the center symbol (e.g., "PEARLS") on reel 38. Payline 44 extends through the center symbol on each reel (e.g., "PEARLS" on reel 30, "ACTRESS" on reel 32, "PAINTING" on reel 34, "VIKING" on reel 36 and "PEARLS" on reel 38.) Payline 45 starts at the center symbol (e.g., "PEARLS") on reel 30, extends through the upper symbol (e.g., "STEER") on reel 32, the center symbol (e.g., "PAINTING") on reel 34, the lower symbol (e.g., "PEARLS") on reel 36 and terminates at the center symbol (e.g., "PEARLS") on reel 38. Payline 46 extends through the lower symbol on each reel (e.g., "PAINTING" on reel 30, "URN" on reel 32, "PEARLS" on reel 34, "PEARLS" on reel 36 and "VIKING" on reel 38.) Payline 47 starts at the lower symbol (e.g., "PAINTING") on reel 30, extends through the lower symbol (e.g., "URN") on reel 32, the center symbol (e.g., "PAINTING") on reel 34, the upper symbol (e.g., "GUARD") on reel 36 and terminates at the upper symbol (e.g., "URN") on reel 38. Payline 48 starts at the lower symbol (e.g., "PAINTING") on reel 30, extends through the center symbol (e.g., "ACTRESS") on reel 32, the upper symbol (e.g., "GUARD") on reel 34, the center symbol (e.g., "VIKING") on reel 36 and terminates at the lower symbol (e.g., "VIKING") on reel 38.

In one embodiment, the symbol groups defining the "basic" game outcomes are evaluated by the processor for winning combinations in either of two payoff modes. In a first payoff mode, winning outcomes are identified by certain predefined winning symbol combinations appearing in the symbol group relative to an active payline. In one embodiment, the basic game automatically begins in the first payoff mode and stays in the first payoff mode until the occurrence of a special symbol combination triggering the second payoff mode. In a second payoff mode, termed a "SUPER SCATTER" mode, winning outcomes are identified by the predefined winning symbol combinations appearing in the symbol group in "scatter-pay" format. In scatter-pay format, winning combinations occur when predefined winning symbol combinations are displayed, in any position, on any of the reels. Thus, symbols making up winning combinations in the SUPER SCATTER mode do not need to be aligned with an active payline or displayed on particular reels. In one embodiment, the basic game operates in the second payoff mode (i.e., SUPER SCATTER mode), once activated, for a fixed number of spins and then returns to the first payoff mode. The SUPER SCATTER mode will be described in detail in relation to FIGS. 4 and 5.

In one embodiment, the symbol groups defining, the game outcomes are evaluated for the same predefined winning symbol combinations in both the first and second payoff modes. The winning combinations are preferably identified on a pay table which is affixed to the machine 10 and/or displayed by the video display 12 in response to a command by the player (e.g., by pressing the "Pay Table" button 54). The pay table enables the player to view the winning, combinations and their associated payoff amounts. If the symbol group includes a winning, combination, the game credits the player an amount corresponding to the award in the pay table for that combination multiplied by the amount of credits bet. The player may collect the amount of accumulated credits by pressing, the "Collect" button 50.

TABLE 2

| WINNING BID ™ Basic Game (First Payoff Mode) | | | | | |
|---|---|---|---|---|---|
| WIN COMBINATIONS | | | | | |
| Reel 30 | Reel 32 | Reel 34 | Reel 36 | Reel 38 | Pay |
| AUCTION | AUC-TION | AUCTION | AUC-TION | AUCTION | 5000 |
| AUCTION | AUC-TION | AUCTION | AUC-TION | | 400 |
| AUCTION | AUC-TION | AUCTION | | | 100 |
| AUCTION | AUC-TION | | | | 20 |
| AUCTION | | | | | 2 |
| ACTRESS | ACTRESS | ACTRESS | ACTRESS | ACTRESS | 1000 |
| ACTRESS | ACTRESS | ACTRESS | ACTRESS | | 120 |
| ACTRESS | ACTRESS | ACTRESS | | | 35 |
| GUARD | GUARD | GUARD | GUARD | GUARD | 1000 |
| GUARD | GUARD | GUARD | GUARD | | 100 |
| GUARD | GUARD | GUARD | | | 30 |
| STEER | STEER | STEER | STEER | STEER | 1000 |
| STEER | STEER | STEER | STEER | | 80 |
| STEER | STEER | STEER | | | 25 |
| Any Char | Any Char | Any Char | Any Char | Any Char | 70 |
| Any Char | Any Char | Any Char | Any Char | | 12 |
| Any Char | Any Char | Any Char | | | 5 |
| URN | URN | URN | URN | URN | 200 |
| URN | URN | URN | URN | | 80 |
| URN | URN | URN | | | 15 |
| PEARLS | PEARLS | PEARLS | PEARLS | PEARLS | 150 |
| PEARLS | PEARLS | PEARLS | PEARLS | | 60 |
| PEARLS | PEARLS | PEARLS | | | 12 |
| VIKING | VIKING | VIKING | VIKING | VIKING | 120 |
| VIKING | VIKING | VIKING | VIKING | | 50 |
| VIKING | VIKING | VIKING | | | 10 |
| LAMP | LAMP | LAMP | LAMP | LAMP | 100 |
| LAMP | LAMP | LAMP | LAMP | | 40 |
| LAMP | LAMP | LAMP | | | 7 |
| GAVEL | | GAVEL | | GAVEL | 0 |
| SUPER | | SUPER | | SUPER | 5 |

Table 2 is a pay table identifying various winning combinations of symbols in the WINNING BID™ basic game in the first payoff mode. The "WIN COMBINATIONS" portion identifies the various symbol combinations providing a payoff when they stop on the designated reels of an active payline in the first payoff mode. The specific type(s) and number(s) of symbol combinations define the various winning combinations. Generally, except for the "AUCTION" combination, winning combinations in the first payoff mode require that at least three of five corresponding symbols be displayed on the active payline on the designated reels. For example, the symbol combinations of five "ACTRESS" symbols (i.e. on reels 30 through 38), four "ACTRESS" symbols (i.e. on reels 30 through 36) and three "ACTRESS" symbols (i.e. on reels 30 through 34) stopping on the payline provide a payoff in the first payoff mode.

As shown in Table 2, the "AUCTION" symbol has five winning combinations in the first payoff mode of the WINNING BID™ basic game, including: five "AUCTION" symbols (i.e. on reels 30 through 38), four "AUCTION" symbols (i.e. on reels 30 through 36), three "AUCTION" symbols (i.e. on reels 30 through 34), two "AUCTION" symbols (i.e. on reels 30 through 32), and a single "AUCTION" symbol (i.e. on reel 30). Thus, the first payoff mode provides a payoff when any number of one to five "AUCTION" symbols are displayed on the designated reels of the active payline. The first payoff mode of the WINNING BID™ basic game also provides a payoff for mixed combinations of the "AUCTION," "ACTRESS," "GUARD" and "STEER" symbols displayed on the designated reels of the active payline as represented by "AnyChar" in Table 2. For example, the first payoff mode provides a payoff when the active payline displays the symbol combination of "ACTRESS," "GUARD" and "STEER" on reels 30 through 34.

In one embodiment, the "AUCTION" symbol acts as a wildcard for the "STEER," "ACTRESS" and "GUARD" symbols. Thus, for example, the combination of "STEER," "AUCTION" and "STEER" symbols on the active payline is equivalent to the combination of three "STEER" symbols appearing on the designated reels of the active payline.

The "PAY" column of Table 2 identifies the amount of coin(s) or credit(s) awarded as the payoff for the various winning combinations in the basic game, per unit wagered. Thus, for example, the "AUCTION," "AUCTION" combination in the first payoff mode will pay 20 coins or credits with one coin played; that same combination will pay 100 coins or credits with five coins played.

Figure 4:
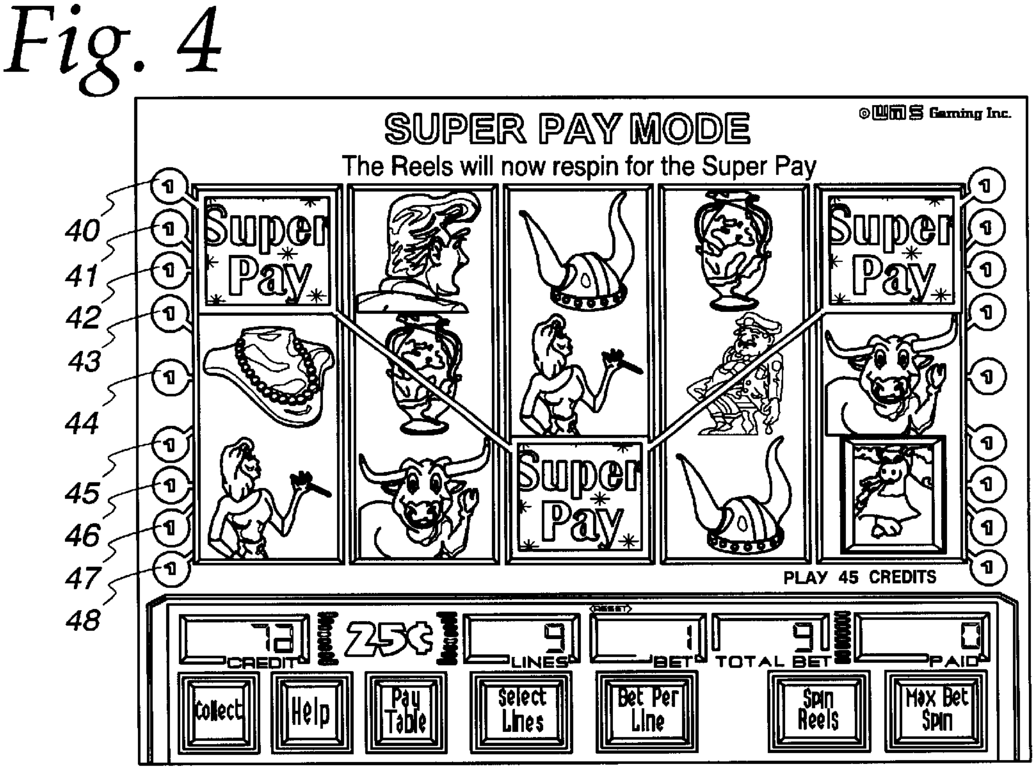
FIG. 4 shows an outcome of the basic game of FIG. 3 which will trigger a SUPER SCATTER bonus feature according to one embodiment of the present invention.

In one embodiment, three "SUPER SCATTER" symbols appearing on an active payline is a winning combination which will trigger a second payoff mode termed a "SUPER SCATTER" mode. An example is shown in FIG. 4 in which the three "SUPER SCATTER" symbols appear on respective reds 30, 34, and 38 along payline 40. As shown in Table 2, the combination of three "SUPER SCATTER" symbols itself has a "PAY" value of 0 credits award in the first payoff mode. Generally, however, a greater award may be expected in the second payoff mode (i.e., SUPER SCATTER mode) which is triggered by three "SUPER SCATTER" symbols. It will be appreciated, however, that alternative embodiments within the scope of the present invention might award a value for the combination of three "SUPER SCATTER" symbols in the first payoff mode. Once the SUPER SCATTER mode becomes active, the CPU 20 causes the reels to "respin" to display a new symbol group. In one embodiment, the CPU 20 operates in the SUPER SCATTER mode for a fixed number of spins (e.g., a single spin) and then returns to the first payoff mode.

Figure 5:
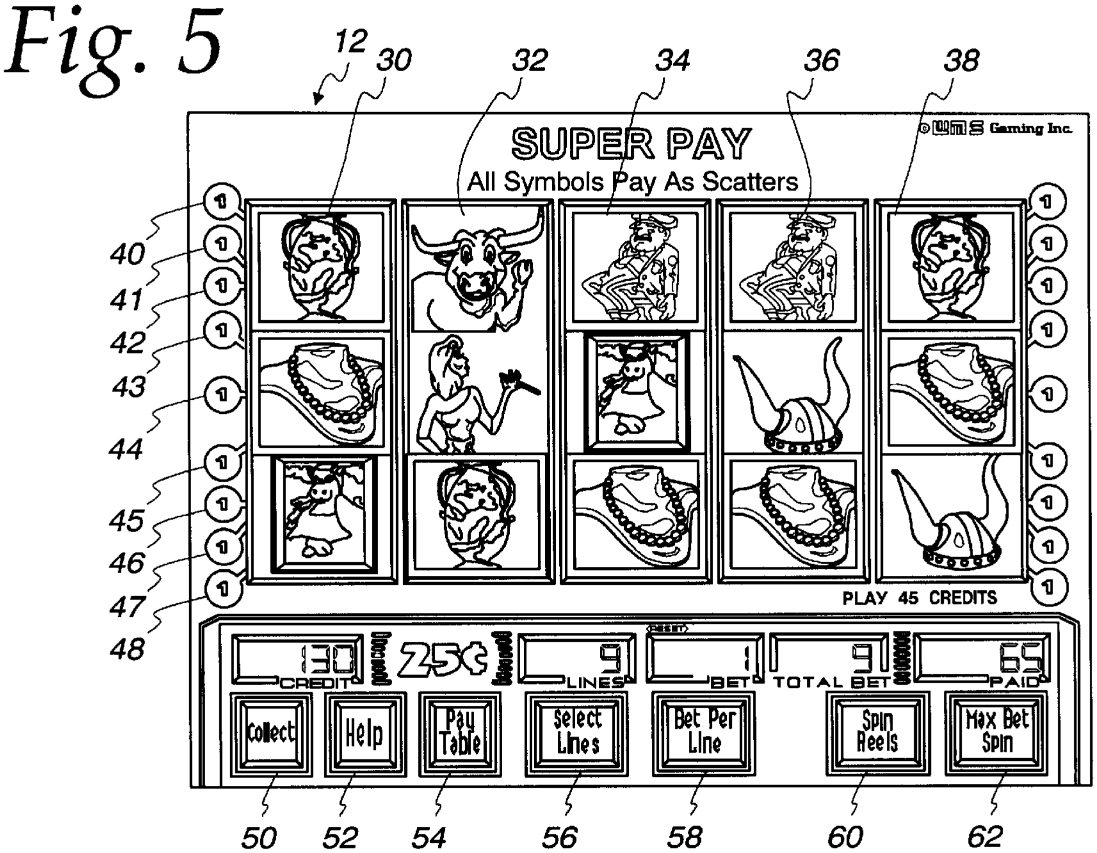
FIG. 5 shows an example outcome of the SUPER SCATTER bonus feature.

FIG. 5 shows the display 12 as it may appear after respinning the reels in the SUPER SCATTER mode. In the SUPER SCATTER mode, the processor evaluates the symbol group for winning symbol combinations which are displayed in scatterpay format, i.e., without regard to the display positions of the respective symbols. In one embodiment, the winning symbol combinations in SUPER SCATTER mode are generally the same combinations as in the first payoff mode, having the same payoff values. In the SUPER SCATTER mode, however, because the symbols are evaluated in scatter-pay format, more than one winning combination is likely to occur. Generally, the player receives the sum of the coin(s) or credit(s) for each winning combination which appears in the SUPER SCATTER mode, except only the highest-value combination is counted for any particular type of combination. For example, if four "PEARLS" symbols appear anywhere on the screen in the SUPER SCATTER mode, the player receives the same amount of coins or credits as would be awarded for four "PEARLS" symbols appearing on an active payline in the first payoff mode. However, the player would not be awarded for the two combinations of three "PEARL" symbols which are necessarily included in the four symbols.

In particular with respect to FIG. 5, there are two winning symbol combinations appearing in the displayed symbol group: a combination of three "URN" symbols (paying 15 credits) and a combination of four "PEARL" symbols (paying 60 credits) for a total of 65 credits.

TABLE 3

| WINNING BID ™ Basic Game (SUPER SCATTER Mode) | | | | | |
|---|---|---|---|---|---|
| WIN COMBINATIONS | | | | | |
| Reel 30 | Reel 32 | Reel 34 | Reel 36 | Reel 38 | PAY |
| AUCTION | AUCTION | AUCTION | AUCTION | AUCTION | 5000 |
| AUCTION | AUCTION | AUCTION | AUCTION | | 400 |
| AUCTION | AUCTION | AUCTION | | AUCTION | 400 |
| AUCTION | AUCTION | | AUCTION | AUCTION | 400 |
| AUCTION | | AUCTION | AUCTION | AUCTION | 400 |
| | AUCTION | AUCTION | AUCTION | AUCTION | 400 |
| AUCTION | AUCTION | AUCTION | | | 100 |
| AUCTION | AUCTION | | AUCTION | | 100 |
| AUCTION | AUCTION | | | AUCTION | 100 |
| AUCTION | | AUCTION | AUCTION | | 100 |
| AUCTION | | AUCTION | | AUCTION | 100 |
| AUCTION | | | AUCTION | AUCTION | 100 |
| | AUCTION | AUCTION | AUCTION | | 100 |
| | AUCTION | AUCTION | | AUCTION | 100 |
| | AUCTION | | AUCTION | AUCTION | 100 |
| | | AUCTION | AUCTION | AUCTION | 100 |
| AUCTION | AUCTION | | | | 20 |
| AUCTION | | AUCTION | | | 20 |
| AUCTION | | | AUCTION | | 20 |
| AUCTION | | | | AUCTION | 20 |
| | AUCTION | AUCTION | | | 20 |
| | AUCTION | | AUCTION | | 20 |
| | AUCTION | | | AUCTION | 20 |
| | | AUCTION | AUCTION | | 20 |
| | | AUCTION | | AUCTION | 20 |
| | | | AUCTION | AUCTION | 20 |
| AUCTION | | | | | 2 |
| | AUCTION | | | | 2 |
| | | AUCTION | | | 2 |
| | | | AUCTION | | 2 |
| | | | | AUCTION | 2 |
| ACTRESS | ACTRESS | ACTRESS | ACTRESS | ACTRESS | 1000 |
| ACTRESS | ACTRESS | ACTRESS | ACTRESS | | 120 |
| ACTRESS | ACTRESS | ACTRESS | | ACTRESS | 120 |
| ACTRESS | ACTRESS | | ACTRESS | ACTRESS | 120 |
| ACTRESS | | ACTRESS | ACTRESS | ACTRESS | 120 |
| | ACTRESS | ACTRESS | ACTRESS | ACTRESS | 120 |
| ACTRESS | ACTRESS | ACTRESS | | | 35 |
| ACTRESS | ACTRESS | | ACTRESS | | 35 |
| ACTRESS | ACTRESS | | | ACTRESS | 35 |
| ACTRESS | | ACTRESS | ACTRESS | | 35 |
| ACTRESS | | ACTRESS | | ACTRESS | 35 |
| ACTRESS | | | ACTRESS | ACTRESS | 35 |
| | ACTRESS | ACTRESS | ACTRESS | | 35 |
| | ACTRESS | ACTRESS | | ACTRESS | 35 |
| | ACTRESS | | ACTRESS | ACTRESS | 35 |
| | | ACTRESS | ACTRESS | ACTRESS | 35 |
| GUARD | GUARD | GUARD | GUARD | GUARD | 1000 |
| GUARD | GUARD | GUARD | GUARD | | 100 |
| GUARD | GUARD | GUARD | | GUARD | 100 |
| GUARD | GUARD | | GUARD | GUARD | 100 |
| GUARD | | GUARD | GUARD | GUARD | 100 |
| | GUARD | GUARD | GUARD | GUARD | 100 |
| GUARD | GUARD | GUARD | | | 30 |
| GUARD | GUARD | | GUARD | | 30 |
| GUARD | GUARD | | | GUARD | 30 |
| GUARD | | GUARD | GUARD | | 30 |
| GUARD | | GUARD | | GUARD | 30 |
| GUARD | | | GUARD | GUARD | 30 |
| | GUARD | GUARD | GUARD | | 30 |
| | GUARD | GUARD | | GUARD | 30 |
| | GUARD | | GUARD | GUARD | 30 |
| | | GUARD | GUARD | GUARD | 30 |
| STEER | STEER | STEER | STEER | STEER | 1000 |
| STEER | STEER | STEER | STEER | | 80 |
| STEER | STEER | STEER | | STEER | 80 |
| STEER | STEER | | STEER | STEER | 80 |
| STEER | | STEER | STEER | STEER | 80 |
| | STEER | STEER | STEER | STEER | 80 |
| STEER | STEER | STEER | | | 25 |
| STEER | STEER | | STEER | | 25 |
| STEER | STEER | | | STEER | 25 |
| STEER | | STEER | STEER | | 25 |

TABLE 3-continued

WINNING BID ™ Basic Game (SUPER SCATTER Mode)

| WIN COMBINATIONS | | | | | |
|---|---|---|---|---|---|
| Reel 30 | Reel 32 | Reel 34 | Reel 36 | Reel 38 | PAY |
| STEER | | STEER | | STEER | 25 |
| STEER | | | STEER | STEER | 25 |
| | STEER | STEER | STEER | | 25 |
| | STEER | STEER | | STEER | 25 |
| | STEER | | STEER | STEER | 25 |
| | | STEER | STEER | STEER | 25 |
| Any Char | Any Char | Any Char | Any Char | Any Char | 70 |
| Any Char | Any Char | Any Char | Any Char | | 12 |
| Any Char | Any Char | Any Char | | Any Char | 12 |
| Any Char | Any Char | | Any Char | Any Char | 12 |
| Any Char | | Any Char | Any Char | Any Char | 12 |
| | Any Char | Any Char | Any Char | Any Char | 12 |
| Any Char | Any Char | Any Char | | | 5 |
| Any Char | Any Char | | Any Char | | 5 |
| Any Char | Any Char | | | Any Char | 5 |
| Any Char | | Any Char | Any Char | | 5 |
| Any Char | | Any Char | | Any Char | 5 |
| Any Char | | | Any Char | Any Char | 5 |
| | Any Char | Any Char | Any Char | | 5 |
| | Any Char | Any Char | | Any Char | 5 |
| | Any Char | | Any Char | Any Char | 5 |
| | | Any Char | Any Char | Any Char | 5 |
| URN | URN | URN | URN | URN | 200 |
| URN | URN | URN | URN | | 80 |
| URN | URN | URN | | URN | 80 |
| URN | URN | | URN | URN | 80 |
| URN | | URN | URN | URN | 80 |
| | URN | URN | URN | URN | 80 |
| URN | URN | URN | | | 15 |
| URN | URN | | URN | | 15 |
| URN | URN | | | URN | 15 |
| URN | | URN | URN | | 15 |
| URN | | URN | | URN | 15 |
| URN | | | URN | URN | 15 |
| | URN | | URN | | 15 |
| | URN | URN | | URN | 15 |
| | URN | | URN | URN | 15 |
| | | URN | URN | URN | 15 |
| PEARLS | PEARLS | PEARLS | PEARLS | PEARLS | 150 |
| PEARLS | PEARLS | PEARLS | PEARLS | | 60 |
| PEARLS | PEARLS | PEARLS | | PEARLS | 60 |
| PEARLS | PEARLS | | PEARLS | PEARLS | 60 |
| PEARLS | | PEARLS | PEARLS | PEARLS | 60 |
| | PEARLS | PEARLS | PEARLS | PEARLS | 60 |
| PEARLS | PEARLS | PEARLS | | | 12 |
| PEARLS | PEARLS | | PEARLS | | 12 |
| PEARLS | PEARLS | | | PEARLS | 12 |
| PEARLS | | PEARLS | PEARLS | | 12 |
| PEARLS | | PEARLS | | PEARLS | 12 |
| PEARLS | | | PEARLS | PEARLS | 12 |
| | PEARLS | PEARLS | PEARLS | | 12 |
| | PEARLS | PEARLS | | PEARLS | 12 |
| | PEARLS | | PEARLS | PEARLS | 12 |
| | | PEARLS | PEARLS | PEARLS | 12 |
| VIKING | VIKING | VIKING | VIKING | VIKING | 120 |
| VIKING | VIKING | VIKING | VIKING | | 50 |
| VIKING | VIKING | VIKING | | VIKING | 50 |
| VIKING | VIKING | | VIKING | VIKING | 50 |
| VIKING | | VIKING | VIKING | VIKING | 55 |
| | VIKING | VIKING | VIKING | VIKING | 50 |
| VIKING | VIKING | VIKING | | | 10 |
| VIKING | VIKING | | VIKING | | 10 |
| VIKING | VIKING | | | VIKING | 10 |
| VIKING | | VIKING | VIKING | | 10 |
| VIKING | | VIKING | | VIKING | 10 |
| VIKING | | | VIKING | VIKING | 10 |
| | VIKING | VIKING | VIKING | | 10 |
| | VIKING | VIKING | | VIKING | 10 |
| | VIKING | | VIKING | VIKING | 10 |
| | | VIKING | VIKING | VIKING | 10 |
| LAMP | LAMP | LAMP | LAMP | LAMP | 100 |
| LAMP | LAMP | LAMP | LAMP | | 40 |
| LAMP | LAMP | LAMP | | LAMP | 40 |

TABLE 3-continued

WINNING BID ™ Basic Game (SUPER SCATTER Mode)

| WIN COMBINATIONS | | | | | |
|---|---|---|---|---|---|
| Reel 30 | Reel 32 | Reel 34 | Reel 36 | Reel 38 | PAY |
| LAMP | LAMP | | LAMP | LAMP | 40 |
| LAMP | | LAMP | LAMP | LAMP | |
| | LAMP | LAMP | LAMP | LAMP | 40 |
| LAMP | LAMP | LAMP | | | 7 |
| LAMP | LAMP | | LAMP | | 7 |
| LAMP | LAMP | | | LAMP | 7 |
| LAMP | | LAMP | LAMP | | 7 |
| LAMP | | LAMP | | LAMP | 7 |
| LAMP | | | LAMP | LAMP | 7 |
| | LAMP | LAMP | LAMP | | 7 |
| | LAMP | LAMP | | LAMP | 7 |
| | LAMP | | LAMP | LAMP | 7 |
| | | LAMP | LAMP | LAMP | 7 |
| SUPER | | SUPER | | SUPER | 0 |

Table 3 is a pay table identifying various winning combinations of symbols in the WINNING BID™ basic game SUPER SCATTER payoff mode. The "WIN COMBINATIONS" portion identifies the various symbol combinations providing a payoff in the SUPER SCATTER mode. Generally, the symbol combinations identified in Table 3 for the SUPER SCATTER mode are the same symbol combinations identified in Table 2 for the first payoff mode, except that winning combinations in the SUPER SCATTER mode occur in scatter-pay format and do not need to be displayed on a particular reel relative to an active payline. Thus, for any particular symbol combination type, there are generally a greater number of winning combinations in the SUPER SCATTER mode than there are in the first payoff mode.

For example, Table 3 indicates that there are thirty-one possible combinations of "AUCTION" symbols that define winning combinations in the SUPER SCATTER mode of the WINNING BID™ basic game (as compared to five winning combinations in the first payoff mode). The winning combinations in the SUPER SCATTER mode include: one combination of five "AUCTION" symbols, five combinations of four "AUCTION" symbols, ten combinations of three "AUCTION" symbols, ten combinations of two "AUCTION" symbols and five combinations of a single "AUCTION" symbol. The winning, combinations of symbols other than "AUCTION" symbols are identified in similar fashion in Table 3.

The "PAY" column of Table 3 identifies the amount of coin(s) or credit(s) awarded for the various winning combinations in the basic game, per unit wagered. The payoff values identified for the various combinations in Table 3 are the same as the payoff values for those combinations in Table 3. Thus, for example, a combination of five "AUCTION" symbols displayed in scatter-pay format in the SUPER SCATTER mode will pay 5,000 coins or credits, the same amount that that combination would pay in the first payoff mode if displayed along an active payline.

In the embodiment of Table 3, three "SUPER SCATTER" symbols appearing in scatter-pay format in SUPER SCATTER mode will result in a payoff (e.g., 5 credits in a 1-coin game) but will not trigger an additional SUPER SCATTER spin. It will be appreciated, however, that alternative embodiments within the scope of the present invention might award different payoff amounts or no payoff, or might provide additional spins in response to "SUPER SCATTER" symbols appearing in scatter-pay format in the SUPER SCATTER mode.

The CPU 20 enters the bonus game when a special "start-bonus" outcome occurs on an active payline in the first payoff mode of the basic game. Specifically, in one embodiment of the WINNING BID™ game, three "GAVEL" symbols displayed, on an active payline, on the respective reels 30, 34 and 38 is a start-bonus outcome which will cause the CPU 20 to enter the bonus game.

In one embodiment, the combination of three "GAVEL" symbols has zero "PAY" value in the basic game, whether occurring in the first payoff mode or the SUPER SCATTER mode. Thus, that ever value may be derived from the combination of three "GAVEL" symbols occurs in the bonus game which is triggered by that combination. It will be appreciated, however, that alternative embodiments within the scope of the present invention may include start-bonus combinations which have pay value(s) in any combination of the basic game (first payoff mode), basic game (second payoff mode) and/or the bonus game, including values which might differ in the respective games.

Figure 6:
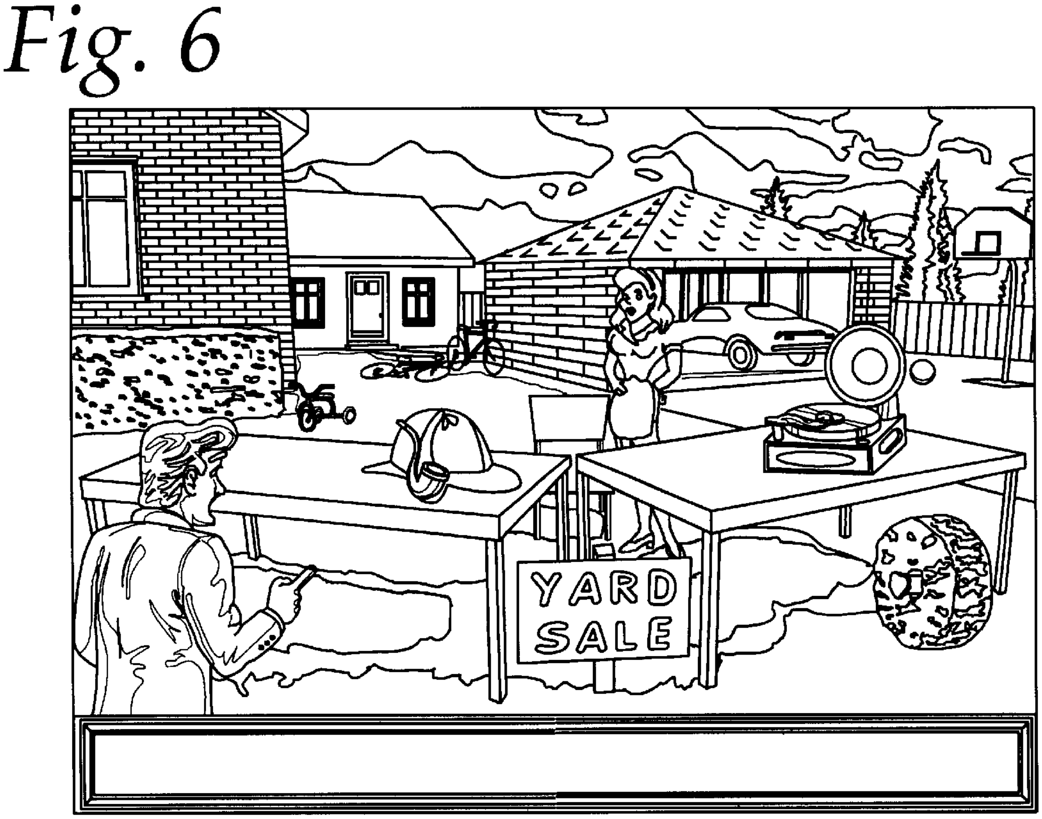
FIG. 6 shows an example display screen which might appear in an item selection mode of a bonus game with auction theme according to one embodiment of the present invention.

Upon entering the bonus game, the CPU 20 operates to replace the display of reels 30 39, 32, 34, 36, and 38 on video display 12 with a bonus game screen depicting a first stage of the bonus game. FIG. 6 is an illustration of a bonus game screen depicting a first stage of the WINNING BID™ bonus game. The bonus game screen of FIG. 6 has a "yard sale" theme which provides for the player to choose a selected item which is to be featured in a later award presentation stage of the bonus game, this latter stage having an "auction" theme in one embodiment which will be described in relation to FIG. 8. It will be appreciated that other embodiments within the scope of the present invention might allow for the player to select a desired item in other than a "yard sale," might provide for an award presentation in other than an "auction" theme, or might provide for the CPU 20, rather than the player, to select the featured item.

Figure 7:
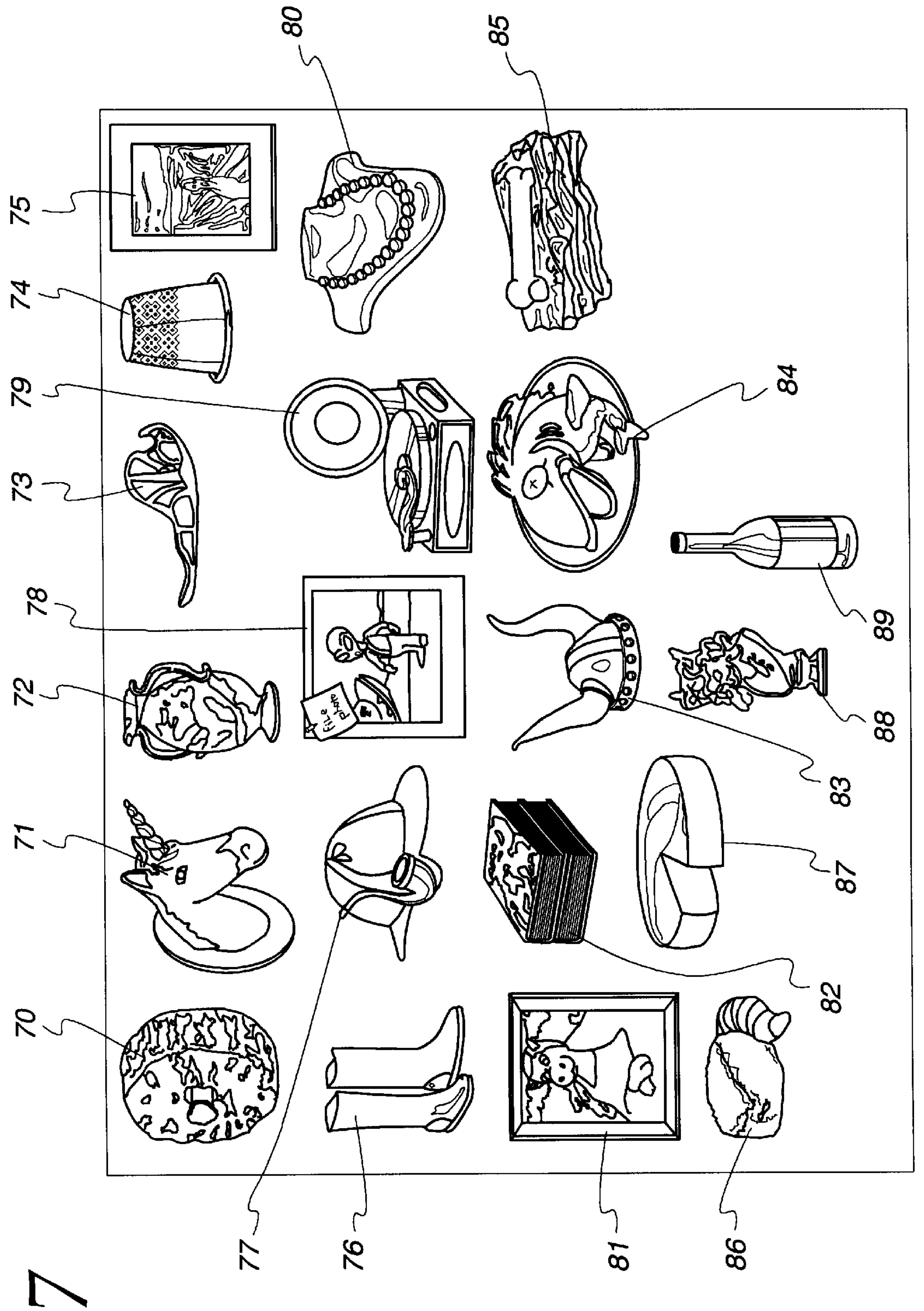
FIG. 7 shows an inventory of various items which might be selected in an item selection mode from a display screen of the type shown in FIG. 6.

FIG. 7 shows an inventory of the some of the items which might be selected for auction in one embodiment of the WINNING BID™ bonus game. The items include: a stone wheel 70, a mounted unicorn head 71, an urn 72, a tiara 73, a large thimble 74, a "Scream" type painting 75, snakeskin boots 76, Sherlock Holmes pipe/hat 77, a photograph of an alien 78, an old phonograph 79, a pearl necklace 80, a "mona lisa" painting 81, a collection of magazines 82, a viking helmet 83, a mounted fish 84, a dinosaur bone 85, a coonskin cap 86, a wheel of cheese 87, a bust of Medusa 88 and a rare bottle of wine 89. It will be appreciated, however, that the inventory may comprise any of several alternative items depending on the game program.

In one embodiment, the CPU 20 randomly selects a predetermined number of items from the inventory to be displayed in the item selection screen of FIG. 6. The item selection screen is preferably a touch-screen display and the player selects an item by touching the screen over the desired item. It will be appreciated, however, that screens other than touch-screen displays may be used and a variety of other alternative means may be used to select the item including, for example, joysticks, trackballs, mouse-type structures, push-buttons or keys. After selection of the desired item, the CPU 20 operates to replace the item selection screen with an award presentation screen which in one embodiment has an "auction" theme.

Figure 8:
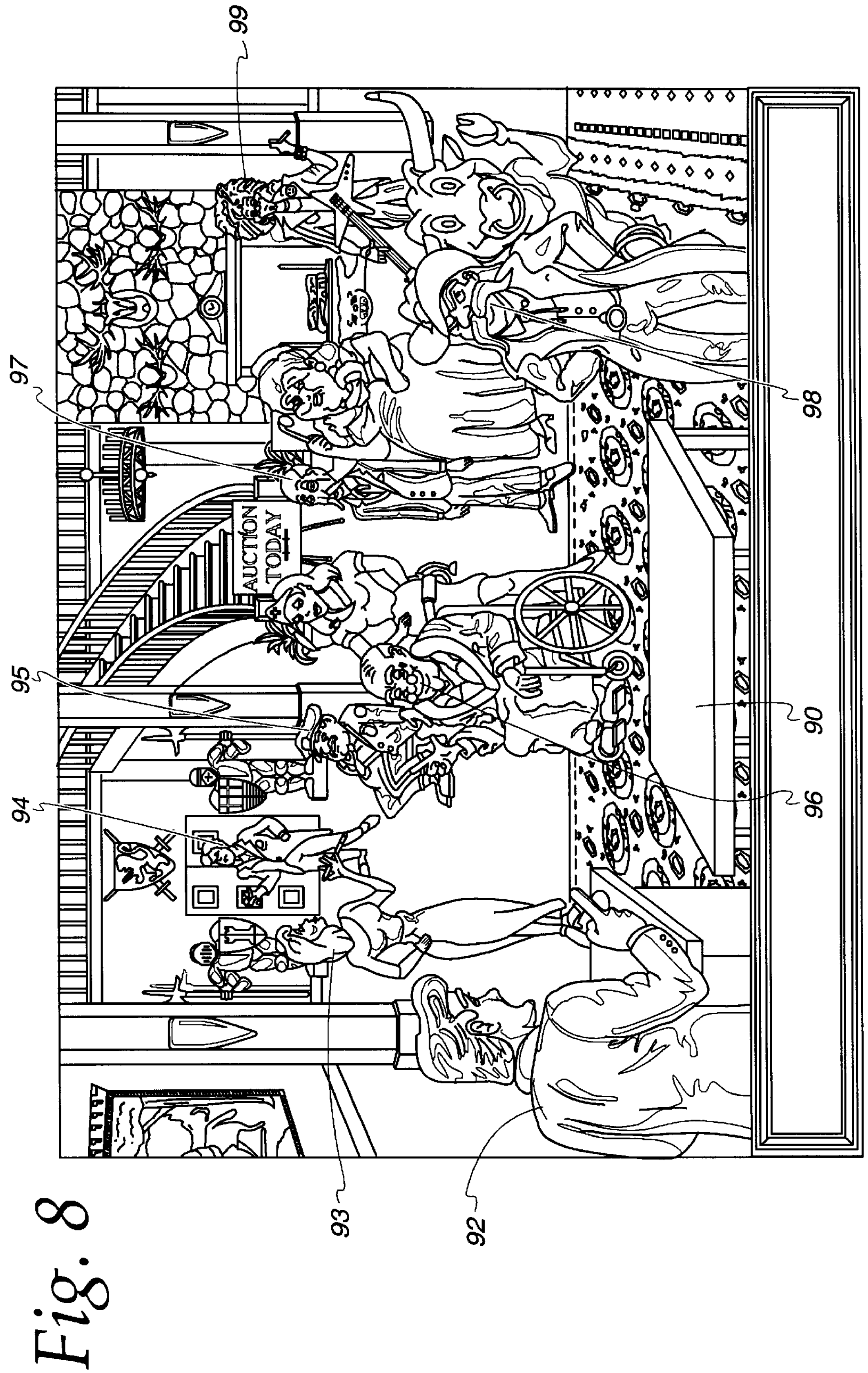
FIG. 8 shows an example display screen which might appear in an auction mode of a bonus game with auction theme according to one embodiment of the present invention.

FIG. 8 is an illustration of an award presentation screen having an auction theme. In the embodiment of FIG. 8, the award presentation screen represents an auction house displaying the selected item (not shown) on table 90 and also showing various characters including an auctioneer 92 and various other characters 93 through 99 for bidding on the item. Specifically, the characters in FIG. 8 include: auctioneer 92, sophisticated woman movie star 93, yuppie rich guy "Biff Diamond" 94, sleeping security guard 95, old guy in a wheelchair (with nurse) 96, snobby rich couple 97, oil tycoon (with steer) 98 and a British rock star 99. Of course, it will be appreciated that any of several different characters might be shown on the award presentation screen depending on the game program.

With an auction award presentation screen such as the type shown in FIG. 8, the CPU 20 provides an award presentation characterized by the various characters "bidding" on the selected object. The auction progresses with selected characters making escalating bids on the selected object until the occurrence of a final "winning" bid. Generally, each of the bids represent award values which might be awarded in the bonus game and the player is awarded the award value associated with the final "winning" bid (multiplied by the amount bet). The award presentation thereby provides a mixture of excitement and apprehension to the player watching the progression of bids and hoping for a high "winning" bid which will result in a high payout. Briefly, the auction award presentation provides great player anticipation with an increasing non-linear sequence of potential awards.

TABLE 4

| WINNING BID ™ AUCTION SUMMARY AUCTION SUMMARY | | |
|---|---|---|
| Outcomes | Weight | Bonus Prob |
| 10 | 0 | 0 |
| 20 | 0 | 0 |
| 30 | 0 | 0 |
| 40 | 0 | 0 |
| 50 | 30 | 0.04011 |
| 60 | 30 | 0.04011 |
| 70 | 30 | 0.04011 |
| 80 | 40 | 0.05348 |
| 90 | 40 | 0.05348 |
| 100 | 40 | 0.05348 |
| 110 | 30 | 0.04011 |
| 120 | 30 | 0.04011 |
| 130 | 30 | 0.04011 |
| 140 | 30 | 0.04011 |
| 150 | 30 | 0.04011 |
| 160 | 30 | 0.04011 |
| 170 | 30 | 0.04011 |

TABLE 4-continued

| WINNING BID ™ AUCTION SUMMARY AUCTION SUMMARY | | |
|---|---|---|
| Outcomes | Weight | Bonus Prob |
| 180 | 30 | 0.04011 |
| 190 | 30 | 0.04011 |
| 200 | 30 | 0.04011 |
| 220 | 30 | 0.04011 |
| 240 | 30 | 0.04011 |
| 260 | 30 | 5.04011 |
| 280 | 20 | 0.02674 |
| 300 | 20 | 0.02674 |
| 320 | 12 | 0.01604 |
| 340 | 12 | 0.01604 |
| 360 | 12 | 0.01604 |
| 380 | 12 | 0.01604 |
| 400 | 12 | 0.01604 |
| 420 | 8 | 0.01070 |
| 440 | 8 | 0.01070 |
| 460 | 8 | 0.01070 |
| 480 | 4 | 0.00535 |
| 500 | 4 | 0.00535 |
| 550 | 4 | 0.00535 |
| 600 | 2 | 0.00267 |
| 650 | 2 | 0.00267 |
| 700 | 2 | 0.00267 |
| 750 | 1 | 0.00134 |
| 800 | 1 | 0.00134 |
| 850 | 1 | 0.00134 |
| 900 | 1 | 0.00134 |
| 950 | 1 | 0.00134 |
| 1000 | 1 | 0.00134 |

Table 4 is a summary table identifying various outcomes ("bids") which may be made in one embodiment of the WINNING BID™ game. In one embodiment, the CPU 20 randomly selects a final bid from among the possible "outcomes" identified in the first column of Table 4 before any of the bids are presented to the player. The table is weighted so that certain outcomes ("bids") are generally more likely to be selected than certain other outcomes ("bids") as identified in the second column entitled "weight". For example, the outcome "100" (having a weight of 40) is more likely to be selected for the final bid than the outcome "110" (having a weight of 30). Table 4 also lists the probability of the outcome once in the bonus game.

In one embodiment, the player starts the auction by touching one of the displayed characters, ultimately causing that character to make an opening bid. In one embodiment, the value of the opening bid is determined by the CPU 20 randomly selecting an opening bid from 30 to 100. On the award presentation screen (FIG. 8), the auctioneer starts the bidding at the opening bid and then the selected character accepts the bid by either speaking or making a gesture. Thereafter, the auction progresses with the auctioneer and/or characters raising the bidding until one of the characters makes the final "winning" bid.

After the opening bid in the auction, the CPU 20 selects the character to make the subsequent bid. Each of the characters have an internal desire factor for particular auction items that make them more prevalent to bid. Specifically, each character has an assigned desire factor between one and ten using logical affiliations. For example, the rancher has a high desire factor for the cowboy boots but the actress has a low desire. Touching the character for the opening bid increases their desire factor for the currently auctioned item by five desire points. For each bid after the opening bid, the desire factor of each character is multiplied by a different random number generated by the CPU 20. The character with the highest product of this multiplication makes the bid on the auction item. For example, suppose the actress has the desire factor of four and the random multiplier of nine, and the rock star has the desire factor of seven and the random multiplier of three. The actress bids because four times nine is greater than seven times three. This method allows some characters to have strong desires for particular auction items but randomness still exists in the bidding process.

In one embodiment, the amount(s) of the raises in bidding are determined by the CPU 20 according to an increment table which in one embodiment varies from 10 to 50, but not to exceed the final bid. For example, suppose the CPU 20 selects an opening bid of "60" and a final bid of "110." Further assume that the increment table dictates consecutive non-linear increments of 10, 10, 20, 20, 30, etc. The CPU 20 might determine "70" to be the first intermediate bid (i.e., the sum of "60" and the first increment "10"), then determine "80" to be the next bid (i.e., the sum of "70" and the second increment "10"), then determine "100" to be the next bid (i.e., the sum of "80" and the third increment "20"), then determine "120" be the next bid (i.e., the sum of "100" and the fourth increment "20") but, because "120" exceeds the final bid of "110," the CPU 20 will cause bids of "60," "80," "100" and "120" to be presented, in sequence, in the award presentation.

To increase player excitement in one embodiment, the CPU 20 randomly executes a non-linear jump bid about every fourth bid. During the jump bid, one of the characters shouts out a value which is higher than the ask bid given by the auctioneer 92. Jump bids may only occur for a small subset of the outcomes, namely the outcomes of 70, 100, 150, 200, 250, 300, 400, 500, 600, 700, 800, 900 and 1000. The CPU 20 will only execute jump bid to the next jump bid value if the jump bid does not exceed the selected final outcome. For example, if the present bid is 120, the CPU 20 executes a jump bid to 150.

In one embodiment, there will occasionally be an irregular time interval between bids, namely a lull in the bidding causing the auctioneer to say "Going Once, Going Twice . . . " after an intermediate bid before a character accepts the bid, thereby giving the false appearance that the bidding is about to end. However, the bidding does not end until the auctioneer says "Sold," with the most recent bid defining the "winning bid" which is to be awarded to the player. This "Going Once, Going Twice . . . " time tease randomly occurs about every sixth bid. On half of the large outcomes, the character "Biff Diamond" enters the room during the action and overbids.

During the auction presentation, the characters randomly stop bidding. The "Biff Diamond" character adds further excitement to the auction. On half of the large outcome, "Biff Diamond" enters the room during the bidding and overbids to force large outcomes. For entertainment value, the auction presentation includes some fanciful features. When a character is outbid for a second time during the auction. their face has a surprise look. When a character is outbid for a fourth time, their face has an angry expression.

The auction presentation ends when the auctioneer says Going Once, Going Twice, Sold." The CPU 20 then awards the player the amount of the final bid multiplied by the line bet and returns to the basic game.

It will be appreciated that the present invention has generally been described with reference to a particular embodiment of the WINNING BID™ game, but the present invention is not limited to the particular embodiments described herein. For example, while the aforementioned game has a basic game in the form of a slot machine, the present invention may be implemented with virtually any type of game of chance or skill or combination of such games having outcomes (e.g., "start-bonus" outcomes) which may trigger play of a bonus game. The basic game may comprise, for example, a video poker or video blackjack game. Other variations within the scope of the present invention include bonus games with different themes, different displays and/or different types of award presentations, basic games with different numbers and types of reels and/or symbols, different payoff modes and/or payline configurations, and basic or bonus games with different values of coin awards, different probabilities, expected values, etc.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of operating a gaming machine under control of a processor, the method comprising the steps of:

executing, under processor control, a bonus game program defining an award presentation in which bids are made upon a selected object, the bonus game program defining a plurality of game characters;

selecting, under processor control, a sequence of the bids which are to be made in the award presentation, the sequence of bids including an opening bid, a number of intermediate bids and a final bid defining a winning bid;

presenting the bids in the award presentation, respective ones of the game characters presenting and announcing the bids; and awarding a payoff to the player based on the winning bid.

2. A method of operating a gaming machine under control of a processor, the method comprising the steps of:

executing, under processor control, a bonus game program defining an award presentation in which bids are made upon a selected object, the bonus game program defining a plurality of game characters;

selecting, under processor control, a sequence of the bids which are to be made in the award presentation, the sequence of bids including an opening bid, a number of intermediate bids and a final bid defining a winning bid;

presenting the bids in the award presentation, wherein the step of presenting bids includes the step of selecting designated ones of the game characters for presenting the bids; and awarding a payoff to the player based on the winning bid.

3. The method of claim 2 wherein the step of selecting game characters comprises selecting at least one of the game characters under player control.

4. The method of claim 2 wherein the step of selecting game characters comprises selecting a preferred character under player control.

5. The method of claim 4 wherein the step of presenting bids comprises the preferred character announcing the opening bid.

6. The method of claim 1 wherein the step of selecting game characters comprises selecting a plurality of the game characters under processor control.

7. The method of claim 6 wherein the step of selecting game characters comprises selecting respective game characters for presenting the bids according to a selection probability defined by the game program.

8. The method of claim 7 wherein the game program defines a selection probability for the various characters which varies according to the selected object.

9. The method of claim 2 wherein the step of selecting game characters comprises selecting a preferred character under player control and a plurality of other game characters under processor control.

10. The method of claim 9 wherein the game program defines a default selection probability for each of the various characters, and further including the step of increasing the selection probability of the preferred character so that it is higher than the default selection probability.

11. A method of conducting a game of chance on a gaming machine under control of a processor, the method comprising:

receiving a wager from a player;

executing, under processor control, a game program defining an award presentation and a plurality of different dynamic characters depicted on a video display;

randomly selecting, under processor control, a sequence of awards for said award presentation;

successively displaying the sequence of awards to the player via the video display at time intervals determined by the processor, the awards in the sequence being associated with respective ones of the characters; and awarding a payoff to the player based on one or more of the awards.

12. The method of claim 11 wherein the sequence of awards comprises an escalating sequence.

13. The method of claim 12 wherein the sequence of awards includes an opening award, a number of intermediate awards and a final award, and wherein the step of randomly selecting a sequence of awards includes the step of selecting, under processor control, the final award from a plurality of possible final awards.

14. The method of claim 13 wherein the step of randomly selecting a sequence of awards includes the step of selecting, under processor control, the opening award from a plurality of possible opening awards.

15. The method of claim 13 wherein the step of randomly selecting a sequence of awards includes the steps of selecting an award increment and determining, under processor control, an intermediate award by adding the selected award increment to a previous award.

16. The method of claim 15 wherein the step of randomly selecting a sequence of awards comprises selecting n award increments and determining, under processor control, n intermediate awards by adding, one at a time, respective ones of the selected n award increments to previous awards.

17. The method of claim 16 wherein a first one of the n award increments is added to the opening award to define a first one of the n intermediate awards.

18. The method of claim 17 wherein consecutive ones of the n award increments are added, one at a time, to most recent ones of the n intermediate awards to define next consecutive ones of the n intermediate awards.

19. The method of claim 11 wherein the awards represent a value of one or more objects.

20. A gaming machine comprising:

a processor operable to execute, in response to a wager, a game program defining an award presentation and a plurality of different dynamic characters;

a selection element for randomly selecting, under processor control, a sequence of awards for said award presentation;

a video display for successively displaying the sequence of awards to the player at time intervals determined by the processor, the awards in the sequence being associated with respective ones of the displayed characters; and a payout mechanism for awarding a payoff to the player based on one or more of the awards.

* * * * *

UNITED STATES PATENT AND TRADEMARK OFFICE

CERTIFICATE OF CORRECTION

PATENT NO. : 6,358,147 B1
DATED : March 19, 2002
INVENTOR(S) : Jaffe et al.

It is certified that error appears in the above-identified patent and that said Letters Patent is hereby corrected as shown below:

Title page,
Item [56], U.S. PATENT DOCUMENTS, 6,159,098 reference, delete "Stomiany" and insert -- Slomiany --
Insert the following reference, -- 5,951,397 9/1999 Dickinson 463/36 --

OTHER PUBLICATIONS, Buccaneer Gold reference, delete "Jul. 1, 1998" and insert -- Jul. 17, 1998 --
Viva! Las Vegas reference, after "Viva!" insert -- Six! --
Arabian Riches reference, delete "publications" and insert -- publication --

Column 18,
Line 63, delete "1" and insert -- 2 --

Signed and Sealed this

Twenty-second Day of October, 2002

*Attest:*

JAMES E. ROGAN

*Attesting Officer*

*Director of the United States Patent and Trademark Office*